July 27, 1943.    J. M. FLOYD    2,325,497
HEAD FOR ENAMELED TANKS
Filed May 6, 1940
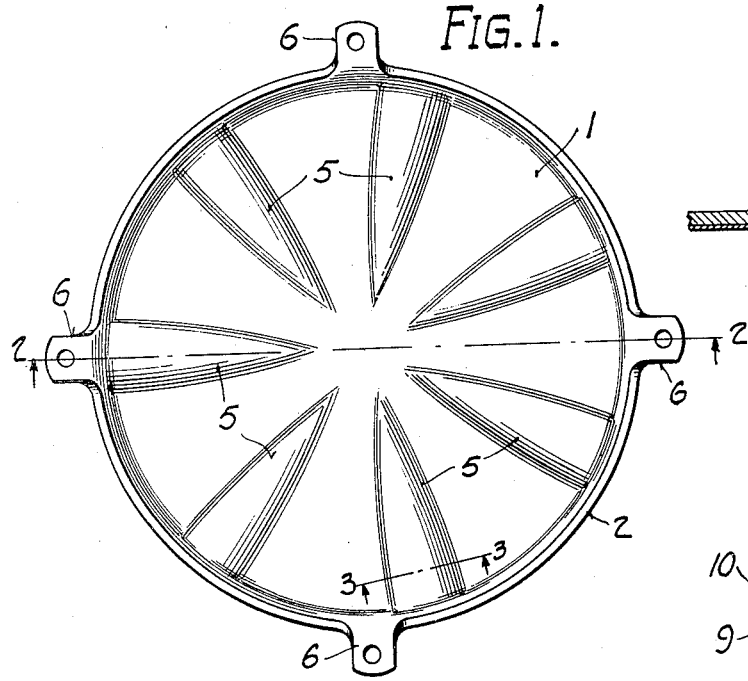
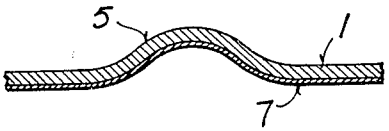
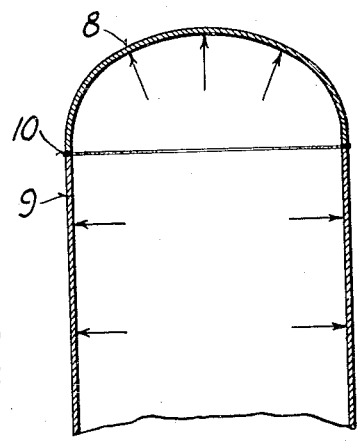
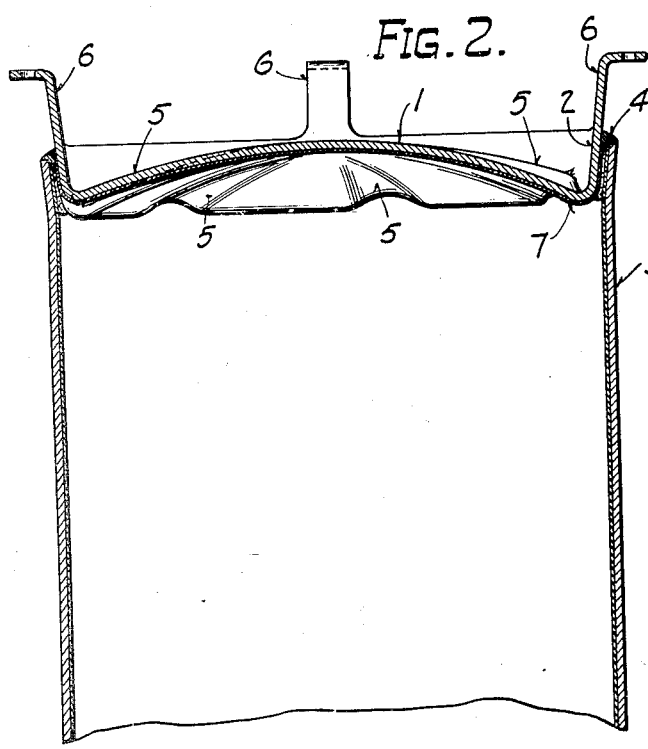
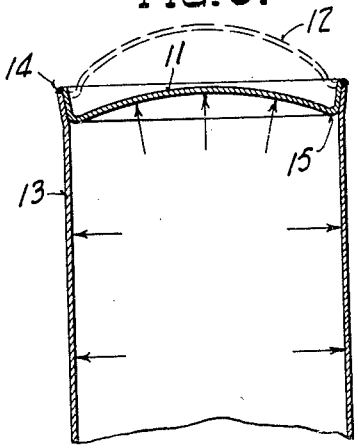
John M. Floyd
INVENTOR.
BY *Elwin C. Andrus*
ATTORNEY.

Patented July 27, 1943

2,325,497

UNITED STATES PATENT OFFICE 2,325,497

HEAD FOR ENAMELED TANKS

John M. Floyd, Shorewood, Wis., assignor to A. O. Smith Corporation, Milwaukee, Wis., a corporation of New York Application May 6, 1940, Serial No. 333,620

1 Claim. (Cl. 220—63)

This invention relates to heads for tanks provided with a vitreous enamel lining.

An object of the invention is to provide an improved form of head for tanks of this character.

A further object of the invention is to provide a head resistant to deflection and deformation which might crack off the enamel lining.

These and other objects of the invention will be clear from the following description and the accompanying drawing in which:

Figure 1 is a plan view of a head formed in accordance with this invention;

Fig. 2 is a section on the line 2—2 of Fig. 1;

Fig. 3 is a section on the line 3—3 of Fig. 1; and

Figs. 4 and 5 are diagrams illustrating the actions of water pressure on heads of different shapes.

Vitreous enamel is found to be an excellent lining material for hot water tanks, resistant to the corrosive action of water, permanent, and appliable at a cost not greatly in excess of galvanizing which gives far less effective protection. For best results, however, the tank should be so fabricated as to be free from stress concentration and resistant to deformation by the internal water pressure. An all metal tank can yield locally at points of stress concentration and deform to redistribute the load, but substantial yielding of a tank lined with vitreous enamel is likely to damage the enamel lining. Such yielding and consequent deformation is more likely to occur in the heads than in the shell of the tank, as for manufacturing and other reasons it is preferred to use dished heads flatter than a hemisphere. One of the important objects of this invention is to provide a head resistant to deformation and particularly well adapted for use in vitreous enameled tanks.

Referring to the drawing, the head 1 is of dished or crowned shape with a reverse flange 2 for attachment to the shell 3 of the tank by means of a weld 4. A plurality of radial corrugations 5 are formed in the head, narrow at the center and widening towards the circumference. Four legs 6 are shown formed integrally with the head and adapted to support the tank, or a casing around it, but the legs form no part of this invention and may be omitted if so desired. No opening for the attachment of water pipes is shown in the head illustrated in the drawing but one can be provided if desired, preferably in the center of the head.

The head is formed by pressing and given an enamel coating 7 on the surface that is to be exposed to the inside of the tank. The enamel on the flange 2 should stop short of the position at which weld 4 is to be made. The head is then inserted in the flared end of the previously enameled shell 3 and welded in place.

The corrugations have the function of stiffening the head and making it resistant to deformation by the water pressure inside the tank. This stiffening effect would be needed but little, if at all, in a full dished head approximately semi-elliptical in shape on a diametral section and united to the shell as shown diagrammatically in Fig. 4, in which 8 is the dished head, 9 the shell, and 10 a weld uniting the two. Water pressure acting in the direction of the arrows has but little tendency to deform either the shell or head unless the pressure is high enough to expand the tank as a whole. This is, of course, a situation which should never arise in practice as the shell and head must have a sufficient thickness of metal to keep the stress below the yield point. A head and shell construction such as that shown diagrammatically in Fig. 4, would, therefore, be highly desirable for vitreous enameled tanks and is, in fact, used with complete success in many storage tanks which are first welded together and then enameled over the whole interior surface.

But however desirable this construction may be where it is feasible, it is not practical for small tanks where the limited dimensions impose obstacles on the welding of the heads to the shell. For the smaller tanks, a head of the form here described is preferable for manufacturing reasons. It is, however, inherently less resistant to deformation than the form shown diagrammatically in Fig. 4.

As shown diagrammatically in Fig. 5, in which a plain or uncorrugated head is portrayed, the tendency of water pressure acting in the direction of the arrows is to bow the flanged head 11 outwardly and cause it to assume a form indicated at 12. It has been found by experiment that provided the shell 13 and weld 14 uniting the head 11 to the shell are of sufficient strength, the head can actually be bowed outwardly. Any such movement causes severe deformation in parts of the head, particularly those parts where the section 15 of relatively large curvature joins the head and the reverse flange. While in actual use, the pressure is below that needed to blow out the head, it can be readily appreciated that even the normal water pressure has a tendency to cause severe deformation of the head near its circumference. This is, of course, highly undesirable since the effect is injurious to the enamel.

The effect of the corrugations in the head of this invention is to stiffen it against the action of the water pressure and to reduce the deformation which would otherwise occur. As a consequence the head can be made of thinner and lighter metal than would otherwise be the case. The shape of the corrugations, themselves, is such as to eliminate stress concentrations and to provide a fairly large curvature of surface for receiving the enamel.

I claim:

In a tank having a vitreous enamel lining fused to the steel wall thereof, an outwardly dished head disposed in and closing the end of said tank, said head having its peripheral portion reversely curved into a peripheral flange with the outer edge of the flange secured to the body of the tank and having radial flutes in the dished portion of the head extending into the reverse curvature between said dished portion and the flange to reenforce the same and prevent stress concentrations tending to crack the enamel.

JOHN M. FLOYD.